United States Patent
Chitti et al.

(10) Patent No.: US 10,177,993 B2
(45) Date of Patent: Jan. 8, 2019

(54) EVENT-BASED DATA TRANSFER SCHEDULING USING ELASTIC NETWORK OPTIMIZATION CRITERIA

(71) Applicant: INTERNATIONAL BUSINESS MACHINES CORPORATION, Armonk, NY (US)

(72) Inventors: Mark V. Chitti, Lexington, KY (US); Douglas M. Freimuth, New York, NY (US); John F. Hollingsworth, Wynnewood, PA (US); Baiju D. Mandalia, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

(21) Appl. No.: 14/952,469

(22) Filed: Nov. 25, 2015

(65) Prior Publication Data
US 2017/0149624 A1    May 25, 2017

(51) Int. Cl.
*H04L 12/24*  (2006.01)
*H04L 12/26*  (2006.01)
*G06F 11/14*  (2006.01)

(52) U.S. Cl.
CPC ......... *H04L 41/50* (2013.01); *G06F 11/1458* (2013.01); *H04L 41/0896* (2013.01); *H04L 43/0876* (2013.01)

(58) Field of Classification Search
None
See application file for complete search history.

(56) References Cited

U.S. PATENT DOCUMENTS

| 4,144,414 A | 3/1979 | Nicholas |
| 6,205,477 B1 | 3/2001 | Johnson et al. |
| (Continued) | | |

FOREIGN PATENT DOCUMENTS

WO    2014021839 A1    2/2014

OTHER PUBLICATIONS

Hwang et al., "Design and Implementation of an iLVM Mechanism for Remote Mirror", Kuasir College of Electrical Engineering and Computer Science, Department of Electrical Engineering, Journal of Internet Technology, 7(2), Apr. 2006, pp. 169-176.

(Continued)

*Primary Examiner* — Angela Nguyen
(74) *Attorney, Agent, or Firm* — William Hartwell; Matthew M. Hulihan; Heslin Rothenberg Farley & Mesiti PC

(57) ABSTRACT

Event-based data transfer scheduling using elastic network optimization criteria is provided. Bandwidth optimization criteria corresponding to different types of data transfer event scenarios are maintained, and based on recognizing a data transfer event scenario, a bandwidth optimization criteria is selected based on a type of the data transfer event scenario. A schedule for transferring data from a source to a target across the elastic network is determined according to the selected bandwidth optimization criteria, and the elastic network is used in transferring the data to the target storage location, where the using includes dynamically configuring elastic network bandwidth allocation from an elastic network service provider and initiating transfer of the data to the target storage location according to the schedule.

20 Claims, 5 Drawing Sheets

(56) References Cited

U.S. PATENT DOCUMENTS

| | | |
|---|---|---|
| 6,389,432 B1 | 5/2002 | Srinivas et al. |
| 6,418,139 B1 | 7/2002 | Akhtar |
| 6,563,829 B1 | 5/2003 | Lyles et al. |
| 6,738,348 B1 | 5/2004 | Rollins |
| 6,937,566 B1 | 8/2005 | Forslow |
| 7,089,294 B1 | 8/2006 | Baskey et al. |
| 7,103,906 B1 | 9/2006 | Katz |
| 7,542,420 B1 | 6/2009 | Mokhtar et al. |
| 7,590,746 B2 | 9/2009 | Slater |
| 7,685,310 B2 | 3/2010 | Ueoka et al. |
| 7,808,918 B2 | 10/2010 | Bugenhagen |
| 7,844,967 B2 | 11/2010 | Kelly |
| 7,983,299 B1 | 7/2011 | Ma |
| 8,412,824 B1 | 4/2013 | Schiff |
| 8,464,335 B1 | 6/2013 | Sinha et al. |
| 8,660,008 B2 | 2/2014 | Babiarz et al. |
| 8,762,505 B2 | 6/2014 | Kutan et al. |
| 8,788,690 B2 | 7/2014 | Short et al. |
| 8,793,343 B1 | 7/2014 | Sorenson, III et al. |
| 8,799,320 B2 | 8/2014 | Chan et al. |
| 8,873,753 B2 | 10/2014 | Parker |
| 8,937,865 B1 | 1/2015 | Kumar et al. |
| 9,026,671 B2 | 5/2015 | Gillies et al. |
| 9,172,771 B1 | 10/2015 | Gross et al. |
| 9,207,993 B2 | 12/2015 | Jain |
| 9,330,156 B2 | 5/2016 | Satapathy |
| 9,495,251 B2 | 11/2016 | Kottomtharayil |
| 9,535,776 B2 | 1/2017 | Klose |
| 9,596,144 B2 | 3/2017 | Anderson |
| 2002/0049841 A1 | 4/2002 | Johnson |
| 2002/0101869 A1 | 8/2002 | Garcia-Luna-Aceves et al. |
| 2002/0112113 A1 | 8/2002 | Karpoff et al. |
| 2002/0124262 A1 | 9/2002 | Basso et al. |
| 2002/0133613 A1 | 9/2002 | Teng et al. |
| 2002/0144174 A1 | 10/2002 | Nwabueze |
| 2002/0181394 A1 | 12/2002 | Partain et al. |
| 2002/0194324 A1 | 12/2002 | Guha |
| 2003/0021338 A1 | 1/2003 | Mazzoni |
| 2003/0037061 A1 | 2/2003 | Sastri et al. |
| 2003/0069963 A1 | 4/2003 | Jayant et al. |
| 2003/0110263 A1 | 6/2003 | Shillo |
| 2003/0120666 A1 | 6/2003 | Tacaille et al. |
| 2003/0126132 A1 | 7/2003 | Kavuri et al. |
| 2003/0172130 A1 | 9/2003 | Fruchtman et al. |
| 2003/0202477 A1 | 10/2003 | Zhen et al. |
| 2004/0098671 A1 | 5/2004 | Graham et al. |
| 2004/0198360 A1 | 10/2004 | Kotzin |
| 2004/0199566 A1 | 10/2004 | Carlson et al. |
| 2004/0215644 A1 | 10/2004 | Edwards, Jr. et al. |
| 2004/0215749 A1 | 10/2004 | Tsao |
| 2004/0246972 A1 | 12/2004 | Wang et al. |
| 2005/0027345 A1 | 2/2005 | Horan et al. |
| 2005/0033935 A1 | 2/2005 | Manbert et al. |
| 2005/0125593 A1 | 6/2005 | Karpoff et al. |
| 2005/0129000 A1 | 6/2005 | Sivakumar et al. |
| 2005/0154841 A1 | 7/2005 | Sastri et al. |
| 2005/0289618 A1 | 12/2005 | Hardin |
| 2006/0039381 A1* | 2/2006 | Anschutz ........... H04L 47/14 370/395.21 |
| 2006/0120282 A1 | 6/2006 | Carlson et al. |
| 2006/0129562 A1 | 6/2006 | Pulamarasetti et al. |
| 2006/0171390 A1 | 8/2006 | LaJoie |
| 2006/0206682 A1 | 9/2006 | Manbert et al. |
| 2006/0218369 A1 | 9/2006 | Fujino |
| 2006/0248231 A1 | 11/2006 | O'Rourke et al. |
| 2006/0265558 A1 | 11/2006 | Fujino |
| 2007/0022264 A1 | 1/2007 | Bromling et al. |
| 2007/0065078 A1 | 3/2007 | Jiang |
| 2007/0106798 A1 | 5/2007 | Masumitsu |
| 2007/0195765 A1 | 8/2007 | Heissenbullel et al. |
| 2007/0198627 A1 | 8/2007 | Bozionek et al. |
| 2008/0109450 A1 | 5/2008 | Clark et al. |
| 2008/0115144 A1 | 5/2008 | Tsao |
| 2008/0126525 A1 | 5/2008 | Ueoka et al. |
| 2008/0140850 A1 | 6/2008 | Gade et al. |
| 2008/0259798 A1 | 10/2008 | Loh |
| 2008/0320097 A1 | 12/2008 | Sawicki et al. |
| 2009/0007199 A1 | 1/2009 | JaJoie |
| 2009/0061853 A1 | 3/2009 | Anschutz |
| 2009/0100163 A1 | 4/2009 | Tsao |
| 2009/0172782 A1 | 7/2009 | Taglienti et al. |
| 2009/0187668 A1 | 7/2009 | Arendt et al. |
| 2009/0204711 A1 | 8/2009 | Binyamin |
| 2009/0217326 A1 | 8/2009 | Hasek |
| 2009/0240867 A1 | 9/2009 | Shibayama et al. |
| 2009/0271589 A1 | 10/2009 | Karpoff et al. |
| 2010/0257602 A1 | 10/2010 | Kettler et al. |
| 2010/0268632 A1 | 10/2010 | Rosenthal |
| 2010/0274656 A1 | 10/2010 | Genschel |
| 2010/0306382 A1 | 12/2010 | Cardosa |
| 2010/0306445 A1 | 12/2010 | Dake |
| 2010/0332401 A1* | 12/2010 | Prahlad ........... G06F 17/30082 705/80 |
| 2011/0004550 A1 | 1/2011 | Giordano et al. |
| 2011/0022697 A1 | 1/2011 | Huh |
| 2011/0078227 A1 | 3/2011 | McAloon et al. |
| 2011/0083037 A1 | 4/2011 | Bocharov et al. |
| 2011/0125889 A1 | 5/2011 | Tsao |
| 2011/0158653 A1 | 6/2011 | Mazed |
| 2011/0208710 A1 | 8/2011 | Lesavich |
| 2011/0218770 A1 | 9/2011 | Ii |
| 2011/0282928 A1 | 11/2011 | Ball et al. |
| 2011/0293278 A1 | 12/2011 | Mazed |
| 2012/0023545 A1 | 1/2012 | Qu |
| 2012/0063353 A1 | 3/2012 | Schlenk |
| 2012/0072600 A1 | 3/2012 | Richardson et al. |
| 2012/0109705 A1 | 5/2012 | Belady et al. |
| 2012/0131309 A1 | 5/2012 | Johnson |
| 2012/0137173 A1 | 5/2012 | Burshan et al. |
| 2012/0180080 A1 | 7/2012 | LaJoie |
| 2012/0201130 A1 | 8/2012 | Liv et al. |
| 2012/0210381 A1 | 8/2012 | Ozawa |
| 2012/0216259 A1 | 8/2012 | Okamoto et al. |
| 2012/0331221 A1 | 12/2012 | Cho |
| 2013/0003538 A1 | 1/2013 | Greenberg et al. |
| 2013/0007254 A1* | 1/2013 | Fries ................. H04L 43/0876 709/224 |
| 2013/0031258 A1 | 1/2013 | Mukai et al. |
| 2013/0081014 A1 | 3/2013 | Kadatch |
| 2013/0185404 A1 | 7/2013 | Patel et al. |
| 2013/0204963 A1 | 8/2013 | Boss et al. |
| 2013/0205002 A1 | 8/2013 | Wang et al. |
| 2013/0212282 A1 | 8/2013 | Puller |
| 2013/0212422 A1 | 8/2013 | Bauer et al. |
| 2013/0227009 A1 | 8/2013 | Padmanaban et al. |
| 2013/0242903 A1 | 9/2013 | Narkar |
| 2013/0254383 A1 | 9/2013 | Wray |
| 2013/0254407 A1 | 9/2013 | Pijewski |
| 2013/0268672 A1 | 10/2013 | Justafort |
| 2013/0282795 A1 | 10/2013 | Tsao |
| 2014/0040343 A1 | 2/2014 | Nickolov et al. |
| 2014/0057592 A1 | 2/2014 | Chetlur |
| 2014/0068076 A1 | 3/2014 | Dasher et al. |
| 2014/0075029 A1 | 3/2014 | Lipchuk |
| 2014/0082301 A1 | 3/2014 | Barton et al. |
| 2014/0082681 A1 | 3/2014 | Brown et al. |
| 2014/0089510 A1 | 3/2014 | Hao et al. |
| 2014/0098685 A1 | 4/2014 | Shattil |
| 2014/0115189 A1 | 4/2014 | Ao et al. |
| 2014/0129819 A1 | 5/2014 | Huang et al. |
| 2014/0180664 A1 | 6/2014 | Kochunni et al. |
| 2014/0188801 A1 | 7/2014 | Ramakrishnan et al. |
| 2014/0207968 A1 | 7/2014 | Kumar et al. |
| 2014/0233587 A1 | 8/2014 | Liv et al. |
| 2014/0244835 A1 | 8/2014 | Lopez Alvarez |
| 2014/0258535 A1 | 9/2014 | Zhang |
| 2014/0281015 A1 | 9/2014 | Orona et al. |
| 2014/0289205 A1 | 9/2014 | Soichi |
| 2014/0344879 A1 | 11/2014 | Phillips et al. |
| 2014/0365658 A1 | 12/2014 | Lang et al. |
| 2015/0006614 A1 | 1/2015 | Suryanarayanan |
| 2015/0019740 A1 | 1/2015 | Zhao |
| 2015/0026793 A1 | 1/2015 | Li |
| 2015/0046960 A1 | 2/2015 | Hardin |

(56) References Cited

U.S. PATENT DOCUMENTS

| | | | |
|---|---|---|---|
| 2015/0067093 A1 | 3/2015 | Sawicki et al. | |
| 2015/0067744 A1 | 3/2015 | Furtwangler | |
| 2015/0082362 A1 | 3/2015 | Hasek | |
| 2015/0117198 A1* | 4/2015 | Menezes | H04L 47/2433 370/235 |
| 2015/0134731 A1 | 5/2015 | Wang et al. | |
| 2015/0134830 A1 | 5/2015 | Popa | |
| 2015/0156204 A1 | 6/2015 | Resch | |
| 2015/0172070 A1 | 6/2015 | Csaszar | |
| 2015/0195173 A1 | 7/2015 | Gupta et al. | |
| 2015/0222445 A1 | 8/2015 | Iyer et al. | |
| 2015/0234636 A1 | 8/2015 | Barnes, Jr. | |
| 2015/0235308 A1* | 8/2015 | Mick | G06Q 30/08 705/26.3 |
| 2015/0288919 A1 | 10/2015 | Labosco | |
| 2015/0339169 A1 | 11/2015 | Siddiqui et al. | |
| 2016/0066261 A1 | 3/2016 | Nasielski et al. | |
| 2016/0197835 A1 | 7/2016 | Luft | |
| 2016/0197848 A1 | 7/2016 | Bhide | |
| 2016/0231948 A1 | 8/2016 | Gupta et al. | |
| 2017/0076057 A1 | 3/2017 | Burton | |
| 2017/0090773 A1 | 3/2017 | Vijayan | |
| 2018/0062943 A1* | 3/2018 | Djukic | H04L 41/5009 |

OTHER PUBLICATIONS

XRoads Networks, "Dynamic Bandwidth Management", retrieved from internet Nov. 11, 2014, http://dualwanfirewalls.com/ubm/solutions/dynamic_bandwidth_control.xrn, pp. 1-4.

IBM, Internal Model for Dynamically-Virtualizing the Storage of Data Between a RAID-6 and a Mirror, IP.com, No. 000160533, Nov. 19, 2007, pp. 1-5.

Weil, Reliable, Scalable, and High-Performance Distributed Storage: Distributed Object Storage, IP.com, No. 000234957, Feb. 19, 2014, pp. 1-11.

List of IBM Patents or Patent Applications Treated as Related, Dec. 1, 2015, pp. 1-2.

Office Action in U.S. Appl. No. 14/952,466, dated Jun. 26, 2017, pp. 1-35.

Office Action in U.S. Appl. No. 14/952,449, dated Jul. 25, 2017, pp. 1-41.

Office Action in U.S. Appl. No. 14/952,456, dated May 17, 2017, pp. 1-25.

Office Action in U.S. Appl. No. 14/952,463, dated May 22, 2017, pp. 1-27.

Office Action in U.S. Appl. No. 14/731,834, dated Apr. 19, 2017, pp. 1-22.

Office Action in U.S. Appl. No. 14/952,437, dated Sep. 18, 2017, pp. 1-36.

Notice of Allowance in U.S. Appl. No. 14/952,456, dated Sep. 15, 2017, pp. 1-14.

List of IBM Patents or Patent Applications Treated as Related, Dec. 18, 2017, pp. 1-2.

Elali, H., SAN Zone Reuse in Port Allocation, https://coprhd.atlassian.net/wiki/spaces/COP/pages/8618000/SAN+Zone+Reuse+in+Port+Allocation, Oct. 15, 2015 (6 pages).

* cited by examiner

US 10,177,993 B2

EVENT-BASED DATA TRANSFER SCHEDULING USING ELASTIC NETWORK OPTIMIZATION CRITERIA

BACKGROUND

Aspects described herein relate to configuration of network features, and more particularly to scheduling data transfers. Bandwidth is conventionally provisioned to meet a projected peak data demand and paid for over the course of a contract that may stretch for several years. Peak demand may occur relatively infrequently, resulting in over-provisioning for a significant amount of time. This over-provisioning of the bandwidth results in excess costs to a customer who is paying for unused bandwidth over the course of the contract.

An attempt to lower costs by provisioning less bandwidth over the course of the contract is largely ineffective because of expensive overcharges when peak demand exceeds the amount of bandwidth provisioned. Bandwidth considerations and costs are especially important in large data center applications, such as data mirroring or backup, where the amount of data being transferred, and therefore the resulting bandwidth consumption, is potentially massive.

SUMMARY

Shortcomings of the prior art are overcome and additional advantages are provided through the provision of a computer-implemented method that includes maintaining a plurality of bandwidth optimization criteria corresponding to a plurality of different types of data transfer event scenarios, the plurality of bandwidth optimization criteria indicating criteria for scheduling a data transfer and dynamically configuring bandwidth allocation from an elastic network service provider of an elastic cloud computing network; based on recognizing a data transfer event scenario, selecting a bandwidth optimization criteria of the plurality of bandwidth optimization criteria based on a type of the data transfer event scenario; determining a schedule for transferring data from a source storage location to a target storage location across the elastic network, the schedule determined according to the selected bandwidth optimization criteria; and using the elastic network in transferring the data to the target storage location, the using comprising dynamically configuring elastic network bandwidth allocation from the elastic network service provider and initiating transfer of the data to the target storage location according to the schedule.

Further, a computer program product including a computer readable storage medium readable by a processor and storing instructions for execution by the processor is provided for performing a method that includes: maintaining a plurality of bandwidth optimization criteria corresponding to a plurality of different types of data transfer event scenarios, the plurality of bandwidth optimization criteria indicating criteria for scheduling a data transfer and dynamically configuring bandwidth allocation from an elastic network service provider of an elastic cloud computing network; based on recognizing a data transfer event scenario, selecting a bandwidth optimization criteria of the plurality of bandwidth optimization criteria based on a type of the data transfer event scenario; determining a schedule for transferring data from a source storage location to a target storage location across the elastic network, the schedule determined according to the selected bandwidth optimization criteria; and using the elastic network in transferring the data to the target storage location, the using comprising dynamically configuring elastic network bandwidth allocation from the elastic network service provider and initiating transfer of the data to the target storage location according to the schedule.

Yet further, a computer system is provided that includes a memory and a processor in communications with the memory, wherein the computer system is configured to perform a method including: maintaining a plurality of bandwidth optimization criteria corresponding to a plurality of different types of data transfer event scenarios, the plurality of bandwidth optimization criteria indicating criteria for scheduling a data transfer and dynamically configuring bandwidth allocation from an elastic network service provider of an elastic cloud computing network; based on recognizing a data transfer event scenario, selecting a bandwidth optimization criteria of the plurality of bandwidth optimization criteria based on a type of the data transfer event scenario; determining a schedule for transferring data from a source storage location to a target storage location across the elastic network, the schedule determined according to the selected bandwidth optimization criteria; and using the elastic network in transferring the data to the target storage location, the using comprising dynamically configuring elastic network bandwidth allocation from the elastic network service provider and initiating transfer of the data to the target storage location according to the schedule.

An example bandwidth optimization criteria corresponds to a predictable type data transfer event scenario in which a data transfer event is planned, the bandwidth optimization criteria specifying an economical bandwidth allocation and transfer of data within a planned time constraint, where the data transfer event scenario comprises a predictable data transfer event scenario and the selected bandwidth optimization criteria is the prior-mentioned bandwidth optimization criteria, and where the schedule is determined and the dynamically configuring the elastic network bandwidth allocation is performed to optimize bandwidth cost in transferring the data within the time constraint.

Another example bandwidth optimization criteria corresponds to an unpredictable type data transfer event scenario in which a data transfer event is unplanned, the bandwidth optimization criteria specifying a priority bandwidth allocation and urgent transfer of data, where the data transfer event scenario comprises an unpredictable data transfer event scenario and the selected bandwidth optimization criteria is the prior-mentioned bandwidth optimization criteria, and where the schedule is determined and the dynamically configuring the elastic network bandwidth allocation is performed to optimize bandwidth cost in allocating a priority level of bandwidth for urgent transfer of data.

Aspects of the above have an advantage over conventional approaches to backup where a constant, static bandwidth allocation is utilized, by providing opportunities for scheduling and bandwidth allocation configuration to optimize the transfer in terms of cost or other properties. Advantageously, dynamic configuration and optimization criteria-based data transfer scheduling enables on-demand access to a variable amount of bandwidth tailorable based on cost, capacity, size of data, and other parameters. Another advantage is that the need for a dedicated link is eliminated, which saves costs, while providing the ability to schedule the backup more dynamically by leveraging the elastic network capability.

The dynamically configuring can include dynamically establishing a relationship with the network service provider to provide bandwidth to effect the transfer of the data. This has an advantage in that the relationship can be established dynamically, requesting only the bandwidth needed and then deallocating that bandwidth when finished in order to reduce costs.

The transfer of the data can occurs across a period of time, where the method further includes facilitating testing of transferred data at the target storage location during the period of time, the facilitating testing including: dynamically provisioning elastic network bandwidth between the target storage location and at least one additional location from which test connections to the transferred data are made; and initiating the test connections to the transferred data at the target storage location from the at least one additional location. An advantage is provided in the use of the dynamic nature of elastic network features to provide additional bandwidth for testing purposes and streamlined migration when requested. By utilizing dynamic bandwidth capacity at both the source and target sites, an advantage is provided in that additional bandwidth can be provided for testing purposes and streamlined migration when requested. This enables more extensive and accurate testing of the transferred data, bolstering the validity of the testing.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects described herein leverage elastic network technologies that provide for dynamic provisioning of wide area network bandwidth and transfer capability between sites. More particularly, data transfer event scenarios are recognized and trigger criteria-based scheduling of data transfers, including dynamic configuration of elastic bandwidth allocation from an elastic network service provider.

Figure 1:
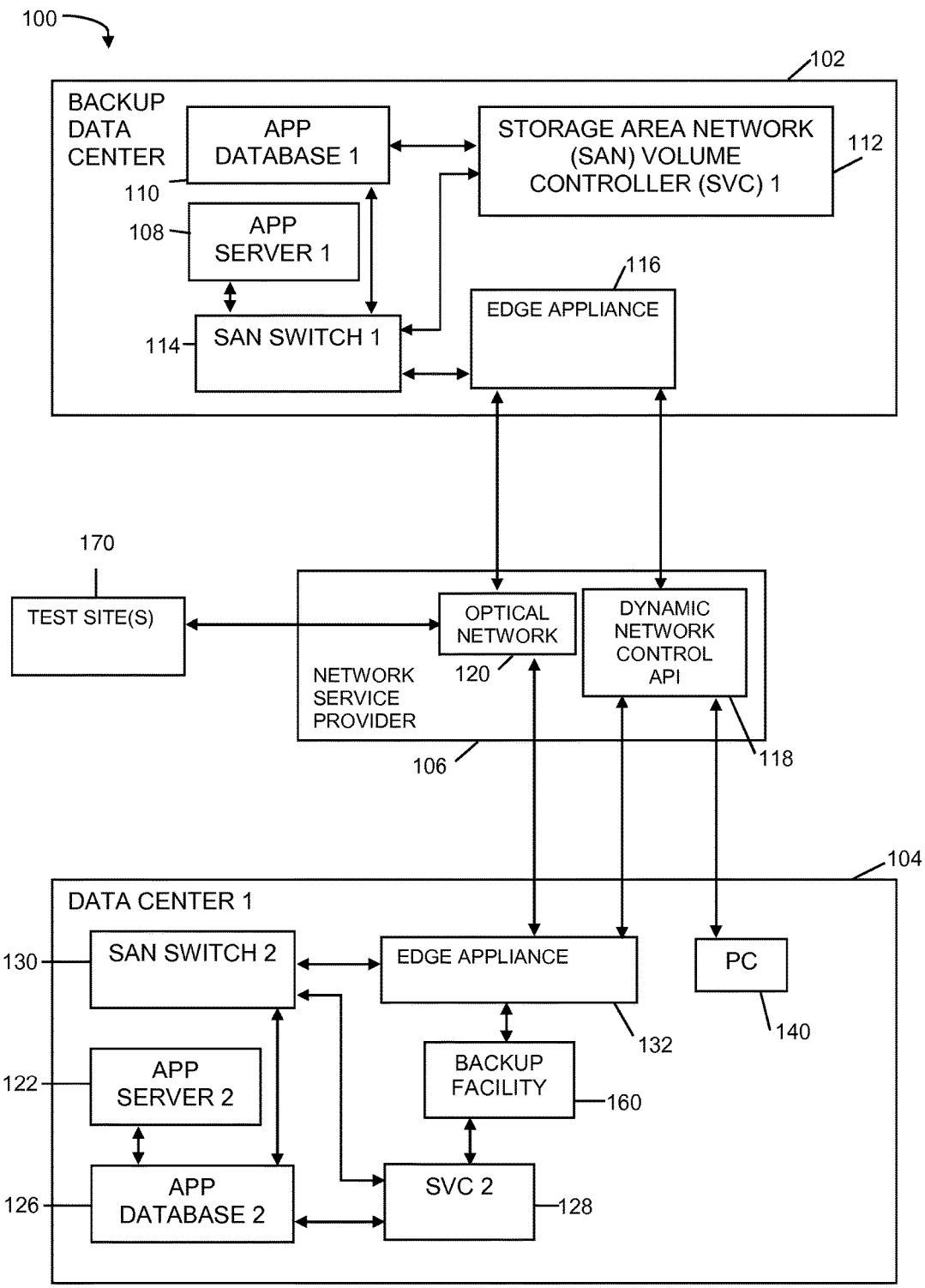
FIG. 1 depicts an example computing environment having elastic network capabilities, to incorporate and use aspects described herein.

FIG. 1 depicts an example computing environment having elastic network capabilities, to incorporate and use aspects described herein. In some examples, dedicated channel(s) across a network are utilized for data transfer from a first storage resource/location to a second storage resource/location. Environment 100 provides, as an example, data transfer between a first site 102 and a second site 104 using at least one network service provider 106 providing an elastic cloud computing network. In one embodiment, network service provider 106 provides a programmable WAN that is used for the data transfer.

First site 102 includes a first application server 108 (i.e. a computer) hosting one or more applications, a first application database 110, a first storage area network (SAN) volume controller (SVC) 112 (i.e., a first storage resource), a first SAN switch 114 and a first edge appliance 116, which may be a router or other edge device, for example. In one embodiment, application server 108 or SVC 112 runs a data replication application that replicates data in first application database 110 from first SVC 112 via first SAN switch 114 and first edge appliance 116.

Management of elastic network bandwidth allocation is provided in the environment. A feature of the environment 100 is that one or more processes can determine and inform a dynamic network control application programming interface (API) 118 of the network service provider about when and how much bandwidth of an elastic cloud computing network 120 should be allocated for transfer of data, which transfer may utilize a dedicated channel to the second site 104 via a network 120. In this example, network 120 is an optical network provided by network service provider 106. In one embodiment, optical network 120 is used as a WAN. In another embodiment, optical network 120 is a Multiprotocol Label Switching (MPLS) network and application server 108 utilizes a Fiber Channel over Ethernet EDU01 network interface to connect first SAN switch 114 and first edge appliance 116 to the MPLS network.

Dynamic network control API 118 is executed, in one example, by a transport device (not shown), that is managed by network service provider 106. Dynamic network control API 118 allows first SVC 112, second SVC 128, an edge appliance (116, 132), a PC 140, or any other component at site 102, 104, or another site to dynamically change bandwidth allocation from network service provider 106. This is leveraged in accordance with aspects described herein to optimize bandwidth allocation and usage and therefore decrease the cost associated with transferring data using that bandwidth.

Second site 104 can include components similar to those of first site 102. Thus, in this example, second site similarly includes a second application server 122 (i.e., a computer), second application database 126, second SVC 128 (i.e., a second storage resource), second SAN switch 130, and a second edge appliance 132. In one embodiment, data is transferred from first site 102 to second site 104, i.e. from first SVC 112 via first SAN switch 114 and first edge appliance 116 over optical network 120 to second SVC 128 via second edge appliance 132 and second SAN switch 130. Data may be transferred similarly from second site 104 to first site 102.

Cloud backup services may be constrained by the cost of WAN capacity. Various types of cloud-provided backup services exist. One example is disaster prevention/recovery involving partial backup for an equipment repair or other purpose, or full backup of an at-risk data center. Another example is scheduled backups, usually being site-wide. For backups that are relatively large—potentially petabytes of data—a physical RAID pack may be copied and securely shipped to the target storage site. In this situation, a digital transfer from one site to another may not be practical. A 1 petabyte site backup would take at least 9 days using a steady 10 Gb/s Ethernet virtual connection (EVC). A more practical timeframe of 1 day using a 90 Gb/s EVC may not be economically feasible.

Described herein are facilities for scheduling backup(s) to a target storage location. Scheduling may be in response to different data transfer event scenarios, which may be of different types, for example predictable or unpredictable type. Depending on the gravity of the event scenario, the transfer schedule can vary. A potentially devastating unpredictable type of event (such as a natural disaster) might warrant a schedule that begins the transfer immediately using a large amount of bandwidth despite the high costs. A less severe and more predictable type of event scenario might dictate that a backup is to occur within the next 36 hours, lending an opportunity to leverage off-peak rates for bandwidth capacity to minimize costs. This has advantages over conventional approaches to backup where a constant, static bandwidth allocation does not provide the same opportunities for scheduling and bandwidth allocation configuration to optimize the transfer in terms of cost or other properties.

Although disaster recovery (DR) backup to a disaster recovery site is a focus of the described examples, it is understood that the principles described herein can be leveraged for any type of backup, or more generally transfer of data, to any kind of site for whatever reason. The backup is done by exploiting elastic network features to accomplish the backup less expensively while providing an enhancement enabling more comprehensive testing of the transferred data.

Aspects provide dynamic requests for DR both for scheduled and unscheduled data transfer events. For scheduled events, there is an opportunity to exploit differences in bandwidth pricing for different capacities, time of day, and other parameters. More bandwidth may be scheduled during off-peak hours, for instance, to reduce costs. Bandwidth optimization criteria for scheduling data transfer can focus on economical bandwidth allocation and transfer of data according to a planned timeframe. Bandwidth optimization criteria for unscheduled events (e.g. ones that indicate an anticipated or actual disaster) can focus on scheduling a more immediate or imminent transfer of some/all data, allowing higher costs to be incurred but optimizing those costs according to available network resources. In an unscheduled data transfer event scenario, the transfer is optimized to prioritize bandwidth allocation and urgent transfer of data. The dynamically configured bandwidth may be provisioned for transferring the data to a destination location, as the target, or an alternate or intermediate data center at the initial target for staging the data for later transfer to the destination. As data is transferred, testing of the data may be facilitated by requesting elastic bandwidth for testing purposes, dynamically allocating additional bandwidth to the target or destination site, and deallocating bandwidth to the source site as the data transfer winds down or disaster on the source site is declared.

For DR purposes in particular, a conventional approach is to have a dedicated, static backup network connection for disaster recovery, the dedicated connection providing limited bandwidth and being a cost sink regardless of whether it is utilized. In contrast, and as advantageously provided herein, dynamic configuration and optimization criteria-based data transfer scheduling enables on-demand access to a variable amount of bandwidth tailorable based on cost, capacity, size of data, and other parameters. It also enables the backup relationship to be established on-demand and/or on a one-off basis, where capacity is requested as desired, potentially in response to a data transfer event indicating that a disaster or other type of event is imminent. Another advantage is that the need for a dedicated link is eliminated, which saves costs while providing the ability to schedule the backup more dynamically by leveraging the elastic network capability. In the case of an impending disaster, the customer is able to move a potentially significantly larger amount of data more in a faster amount of time as compared to a dedicated static connection. This is especially useful when disaster events can be at least somewhat anticipated or predicted, in which case the elastic network capacity for one or more providers can be queried, a schedule for transferring the data can be determined, and elastic network bandwidth can be allocated and used to perform the transfer, the deallocated.

Referring back to FIG. 1, a DR backup facility (process or controller) 160 is shown in data center 1 at source storage location 104. In implementations, this backup facility may be dispersed in one or more other locations such as a DR site or backup data center, e.g. site 102 in FIG. 1, for redundancy purposes. The backup facility may be responsible for exploiting the dynamic bandwidth allocation available from network service provider 106 to perform data transfer/backup tasks at a much lower cost than ordering additional/backup network circuits. A backup process in accordance with aspects described herein provisions bandwidth for the target site (102) and de-provisions bandwidth for the source site (104) as appropriate, based on events such as invocation of a disaster of the main data center site (104).

As described above, the edge appliances 116, 132 or other components of the environment may include dynamic network controls that enable establishment of a relationship with elastic network service provider(s), provision/de-provision of bandwidth, retrieval of bandwidth pricing information, and/or other functions supporting dynamic configuration of network features.

In one example, the dynamic provisioning is dictated by a backup process. The backup process can be configured with bandwidth optimization criteria (e.g. policies) for different types of data transfer event scenarios, such as predictable and unpredictable event scenarios. The criteria can be specified by a user/administrator and modified as desired. Based on recognition of a data transfer event scenario (such as a predicted impending disaster), the backup process can signal an edge appliance, which may be consumer premise equipment (CPE), to dynamically configure the bandwidth according to a schedule that the backup process determines and uses to accomplish the backup. The edge appliance/CPE may include additional functionality including routing and firewall functions, and include separate policies, aside from DR or backup related policies of the backup process, that guide CPE functionality and, optionally, other elastic network feature configurations.

Recognition of a data transfer event scenario can be driven manually or automatically, for instance based on input information from various sources. An unpredictable event scenario might be a natural disaster like a hurricane and input information might be weather data. Another unpredictable event scenario might be a fire in the data center facility, and input information might be a signal from a local fire alarm/detector that a fire is present. A predictable event scenario might be an anticipated or scheduled maintenance of the data center and the input might be the schedule of maintenance or an administrator informing the data center of the maintenance. More generally, the input information can be any information from which a relevant event might be recognized.

An example use case transfers data to a disaster recovery backup data center by exploiting the dynamic bandwidth capability described herein. A bandwidth optimization criteria is selected based on the type of data transfer event scenario recognized, and a schedule for transferring the data from the source location to the target location is determined according to that criteria. The elastic network is used to transfer the data according to the schedule and based on dynamically configuring the elastic network bandwidth allocation from the provider, optimized for the given bandwidth optimization criteria. Eventually after the transfer is complete, and if desired, the main data center is decommissioned and the backup data center takes over as the operational data center supporting the demand. This process also utilizes dynamic reconfiguration of the elastic network. Traffic that was previously directed to the main data center (now offline) is instead directed to the backup site (now considered the primary site). Network capacity provided to the backup site is provisioned accordingly (e.g. increased), and the traffic previously destined for the main data center is migrated to the backup site, which migrates the users, addresses, and so forth. The elastic network capacity provisioned to the main data center is de-provisioned and reallocated to the disaster site, in one example.

Another example use case involves disaster testing. Data centers usually have a disaster contingency plan in place that offers a scripted process in which limited testing proceeds on application(s) at the DR site using pre-staged data and any other software needed to perform the test. One or more test sites connect to that DR site with limited connectivity options to perform testing. This process does not allow enterprise-level testing and usually involves test scenarios that may not accurately reflect actual use. Connection to the DR site for more accurate testing is impractical for various reasons. For instance, the addresses (IP, URLs, etc.) are not easily migrated and there is usually insufficient network capacity dedicated to testing. Moreover, there might be a significant delay in time before adequate capacity is provided to enable proper testing and configuration of the DR site. Because network circuits can be prohibitively expensive, additional capacity for testing purposes has not been available and/or practical.

An advantage of aspects described herein uses the dynamic nature of elastic network features to provide additional bandwidth for testing purposes and streamlined migration when requested. Instead of ordering new circuits, bandwidth can be dynamically allocated for use by test site(s) (see 170 of FIG. 1) to perform disaster testing to an extent not previously possible with static bandwidth connections. In some examples, the test site(s) are actual users who otherwise connect to the source site for production-level tasks. An example implementation first transfers portion(s) of data to the target site and then directs the users at test site(s) 170 to the backup site for testing purposes. The elastic capability of the network enables the appropriate elastic bandwidth allocation to be specified for this testing. To the extent the test site(s) usage of the source data center previously consumed capacity (connections, bandwidth, etc.) of the source site, this capacity can be deallocated from the source data enter and allocated to the DR site in full. Potentially multiple teams of the enterprise can run tests, even as part of their regular tasks, from standard locations on the standard network, instead of separate testing scenarios. An advantage is that is makes the tests more valid. Elastically increasing the amount of bandwidth for a limited duration enables more extensive testing than available on a static limited connection that is typical of existing approaches.

The provisioning of capacity to the test site(s), which may be standard locations accessing the main data center, may be performed by any suitable components, such as a backup process at the target data center, main data center, other component, or distributed among any of the foregoing.

Figure 2:
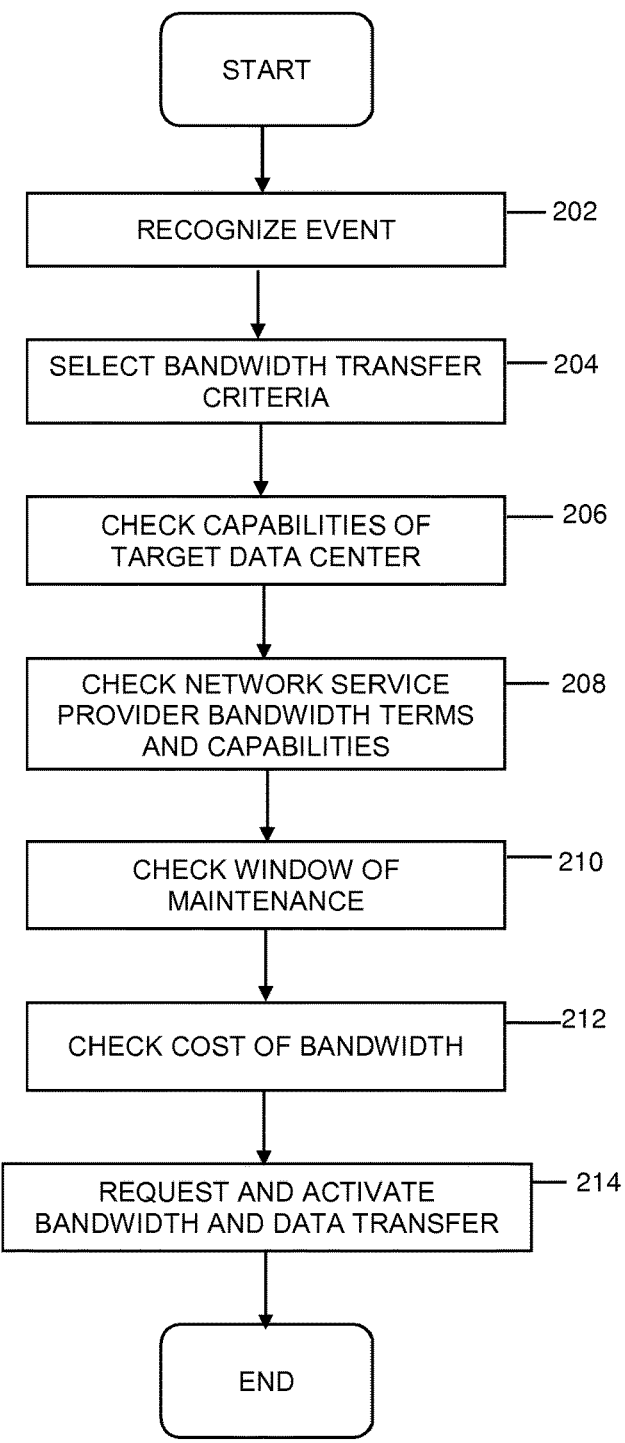
FIG. 2 depicts an example process for transferring data according to a data transfer event scenario, in accordance with aspects described herein.

FIG. 2 depicts an example process for transferring data according to a data transfer event scenario in accordance with aspects described herein. In this example, the process is performed by a backup facility, such as backup facility 16. The process begins with the backup facility recognizing a data transfer event scenario (202) for disaster recovery/backup, which is an event triggered based on information that is received. Data transfer event scenarios can be of different types, for instance a predictable type or an unpredictable type. Example predictable type data transfer event scenarios are indicated by natural disaster warnings, like a hurricane warning, indications of peak business cycle, or large-scale regression testing, as examples. These provide a form of predictable event enabling scheduling of a pre-planned transfer of data and initiation of the transfer according to the schedule using on-demand bandwidth from a network service provider. The transfer can be optimized to attain the most economical transfer that adheres to limitations based on maintenance windows and data center capabilities. Example unpredictable type data transfer event scenarios are indicated by unpredictable environmental events, fire or similar physical disasters, or equipment failure/major maintenance issues, as examples. These provide a form of unpredictable event calling for excess bandwidth to effect an urgent data transfer using on-demand bandwidth from the network service provider. These transfers can be optimized to attain a most economical transfer in terms of bandwidth cost while allocating a priority level of bandwidth for urgent transfer of data and adhering to limitations based on maintenance windows and data center capabilities if appropriate. As noted above, recognition of a data transfer event scenario can be driver but receiving input from any of various sources/sensors and receiving indications of an event or analyzing the received data to recognize the event.

The backup process then selects an appropriate bandwidth transfer criteria depending on the particular type of data transfer event scenario (204). Different bandwidth transfer criteria correspond to different types of data transfer event scenarios and specify criteria to apply in scheduling and transferring the data under the corresponding type of scenario. In an unpredictable data transfer event scenario, the criteria will specify that a priority level of bandwidth is appropriate to effect an urgent transfer of the data. This is despite the fact that the transfer might be less expensive if performed under different parameters like, by deferring to an off-peak time of day for instance. The criteria can specify different factors with weightings, thresholds, and the like for each factor to guide the decision making about exactly when to transfer the data, how much bandwidth to use, and other parameters. The criteria for a predictable data transfer event scenario may include relaxed constraints that enable greater flexibility in scheduling the transfer and therefore in optimizing to total costs. It is also noted that criteria can vary for different predictable events, and likewise for different unpredictable events. A fire in the facility (one unpredictable event) might dictate a more urgent transfer than a hurricane (another unpredictable event) set to arrive in 3 hours, or a switch to battery backup after a power outage (yet another unpredictable event) wherein the battery backup has an expected life of 12 hours.

The process continues by the backup facility checking capabilities of the target data center (206), such as the bandwidth availability and resources for receiving and storing the data, checking the network service provider's bandwidth terms and capabilities (208), any window(s) of maintenance for the data center when transfer is not possible (210), and the cost of bandwidth (212). In some examples, multiple network service providers are queried and a selection between them is made for performing the transfer. The backup facility can then determine a schedule for transferring the data from the source to the target site based on the selected bandwidth optimization criteria and some or all of the above-collected information. The backup facility can also determine the particular configuration for network features that satisfy the optimization criteria. In a predictable event, for example, the criteria might specify that the data is to be transferred within 48 hours and the collected information might indicate that relatively low off-peak rates will be available during a 3 hour timeframe starting at 11:00 PM that night. The determined schedule might dictate that a dynamic allocation is to be made starting at 11:00 PM and for an amount that provides enough bandwidth to transfer all of the desired data in the 3 hour timeframe. As another example, an unpredictable event criteria might emphasize that an immediate transfer of the data is to be made if bandwidth is available under a particular threshold cost, otherwise the data is to be held for retry every 4 hours until an acceptable rate offered by a service provided is found. The process might query multiple providers, find that one is able to offer immediate bandwidth below the threshold cost, and immediately begin the data transfer using that provider. The above example criteria are just examples, and many other examples of optimization criteria exist.

Once the backup facility establishes the schedule, it can then request (or cause another component to request) the appropriate level of bandwidth allocated/deallocated at the appropriate times, and invoke the data transfer accordingly (214), after which the process ends.

Figure 3:
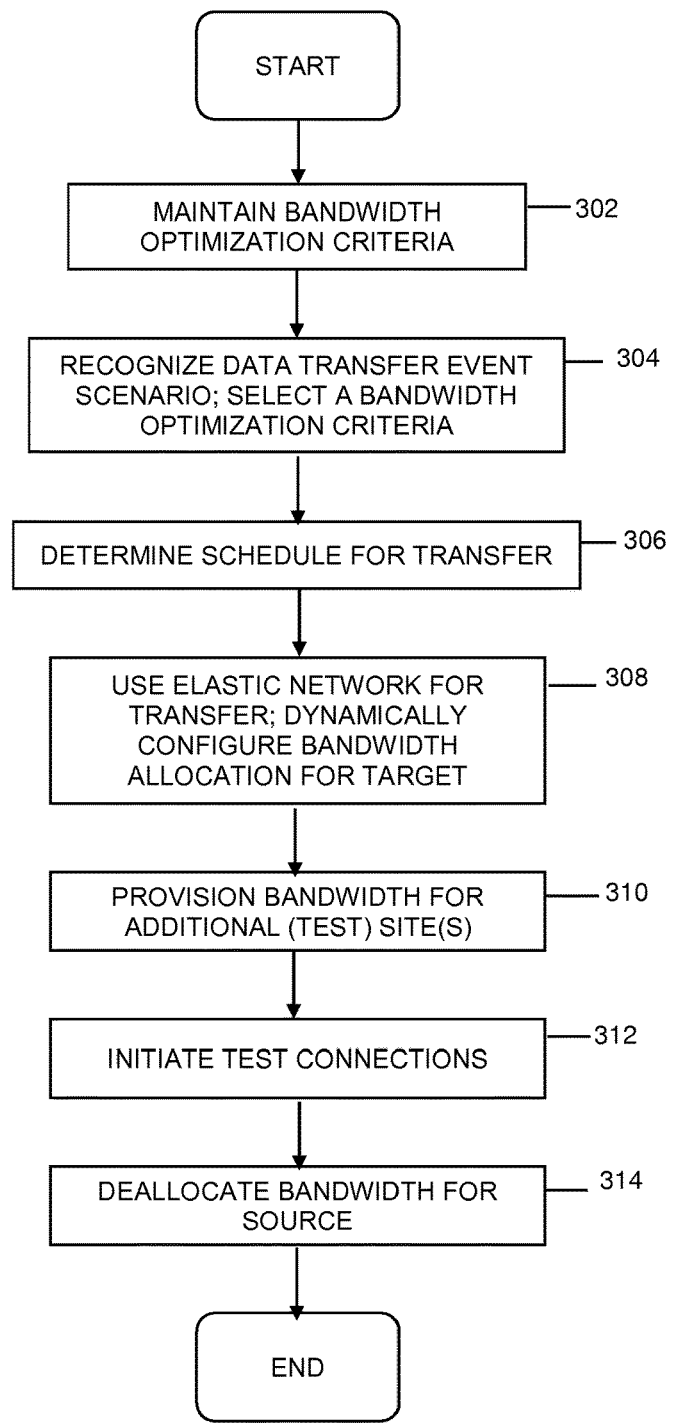
FIG. 3 depicts an example process for event-based data transfer scheduling using elastic network optimization criteria, in accordance with aspects described herein.

FIG. 3 depicts an example process for event-based data transfer scheduling using elastic network optimization criteria, in accordance with aspects described herein. The process is performed by a backup facility, such as a backup control process/system of a source storage site or destination site, an edge appliance, or a combination of the foregoing, as examples. The process begins with the backup facility maintaining a plurality of bandwidth optimization criteria corresponding to a plurality of different types of data transfer event scenarios (302). The criteria may be initially supplied by a user, for example, and can indicate criteria for scheduling a data transfer and dynamically configuring bandwidth allocation from an elastic network service provider of an elastic cloud computing network. As an example, one bandwidth optimization criteria of the plurality of bandwidth optimization criteria corresponds to a predictable type data transfer event scenario in which a data transfer event is planned and the one bandwidth optimization criteria specifies an economical bandwidth allocation and transfer of data within a planned time constraint. As another example, one bandwidth optimization criteria of the plurality of bandwidth optimization criteria corresponds to an unpredictable type data transfer event scenario in which a data transfer event is unplanned and the one bandwidth optimization criteria specifies a priority bandwidth allocation and urgent transfer of data.

Based on recognizing a data transfer event scenario, the backup facility selects a bandwidth optimization criteria of the plurality of bandwidth optimization criteria is based on a type of the data transfer event scenario (304), for example. The backup facility determines a schedule for transferring data from a source storage location to a target storage location across the elastic network (306), the schedule determined according to the selected bandwidth optimization criteria. The schedule may be based on considering any one or more of the following, as examples: cost to transfer the data, taken across a plurality of different bandwidth levels for a plurality of different times of day, a maintenance window, or capabilities of the target storage location to receive and process the data being transferred. As an example, if cost to transfer the data during an off-peak time is significantly lower than peak time, the schedule may be set accordingly. As another example, a schedule may be set around a maintenance window. As yet another example, if the target storage location is expected to have the capacity to receive the data only during particular times or after a reconfiguration, the schedule can be set accordingly.

Then, the backup facility or other component such as the edge appliance uses the elastic network in transferring the data to the target storage location (308), which includes dynamically configuring elastic network bandwidth allocation from the elastic network service provider and initiating transfer of the data to the target storage location according to the schedule.

In one embodiment, the data transfer event scenario includes a predictable data transfer event scenario and the selected bandwidth optimization criteria is a corresponding bandwidth optimization criteria (see above), where the schedule is determined and the dynamically configuring the elastic network bandwidth allocation is performed to optimize bandwidth cost in transferring the data within the time constraint.

In another embodiment, the data transfer event scenario includes an unpredictable data transfer event scenario and the selected bandwidth optimization criteria is a corresponding bandwidth optimization criteria (see above), where the schedule is determined and the dynamically configuring the elastic network bandwidth allocation is performed to optimize bandwidth cost in allocating a priority level of bandwidth for urgent transfer of data.

Dynamically configuring the elastic network bandwidth allocation can include the source location (edge appliance or other component thereof) dynamically establishing a relationship with the network service provider to provide bandwidth to effect the transfer of the data. In this regard, multiple different network service providers may be available, and a dynamically established on-demand relationship may be formed between the source site and one (or more) of the service providers to perform the transfer. A selection can be made between these available providers, perhaps based on updated pricing and other information, thus providing another opportunity for cost optimization. Advantageously, the relationship can be established dynamically, requesting only the bandwidth needed and then deallocating that bandwidth when finished in order to reduce costs.

In this manner, dynamic configuration and optimization criteria-based data transfer scheduling enables on-demand access to a variable amount of bandwidth tailorable based on cost, capacity, size of data, and other parameters. This has advantages over conventional approaches for backing-up data where a constant, static bandwidth allocation does not provide the same opportunities for scheduling and bandwidth allocation configuration to optimize the transfer in terms of cost or other properties.

As an extension, in the case where the transfer of the data occurs across a period of time, testing of transferred data at the target storage location is facilitated during that period of time and thereafter. The facilitating includes, as indicated by the process of FIG. 3, the backup facility or other component dynamically provisioning elastic network bandwidth between the target storage location and at least one additional location/site from which test connections to the transferred data are made (310), and initiating the test connections to the transferred data at the target storage location from the at least one additional location (312). Initiating the test connections can include deallocating existing connections to data at the source storage location and allocating those connections to the transferred data at the target storage location using the dynamically provisioned bandwidth. By utilizing dynamic bandwidth capacity at both the source and target sites, an advantage is provided in that additional bandwidth is provided for testing purposes and streamlined migration when requested. This enables more extensive and accurate testing of the transferred data, which is important in a DR situation, making the tests more valid.

Based on completion of the transfer of the data, the backup facility or other component deallocates elastic network bandwidth provided to the source storage location from the elastic network service provider (314), which eliminates the continuing costs that would otherwise be incurred by carrying that additional bandwidth. The deallocating can include sending a command to the network service provider that adjusts bandwidth to the data center.

Processes described herein may be performed singly or collectively by one or more computer systems, such as computer system(s) described below with reference to FIG. 4.

Figure 4:
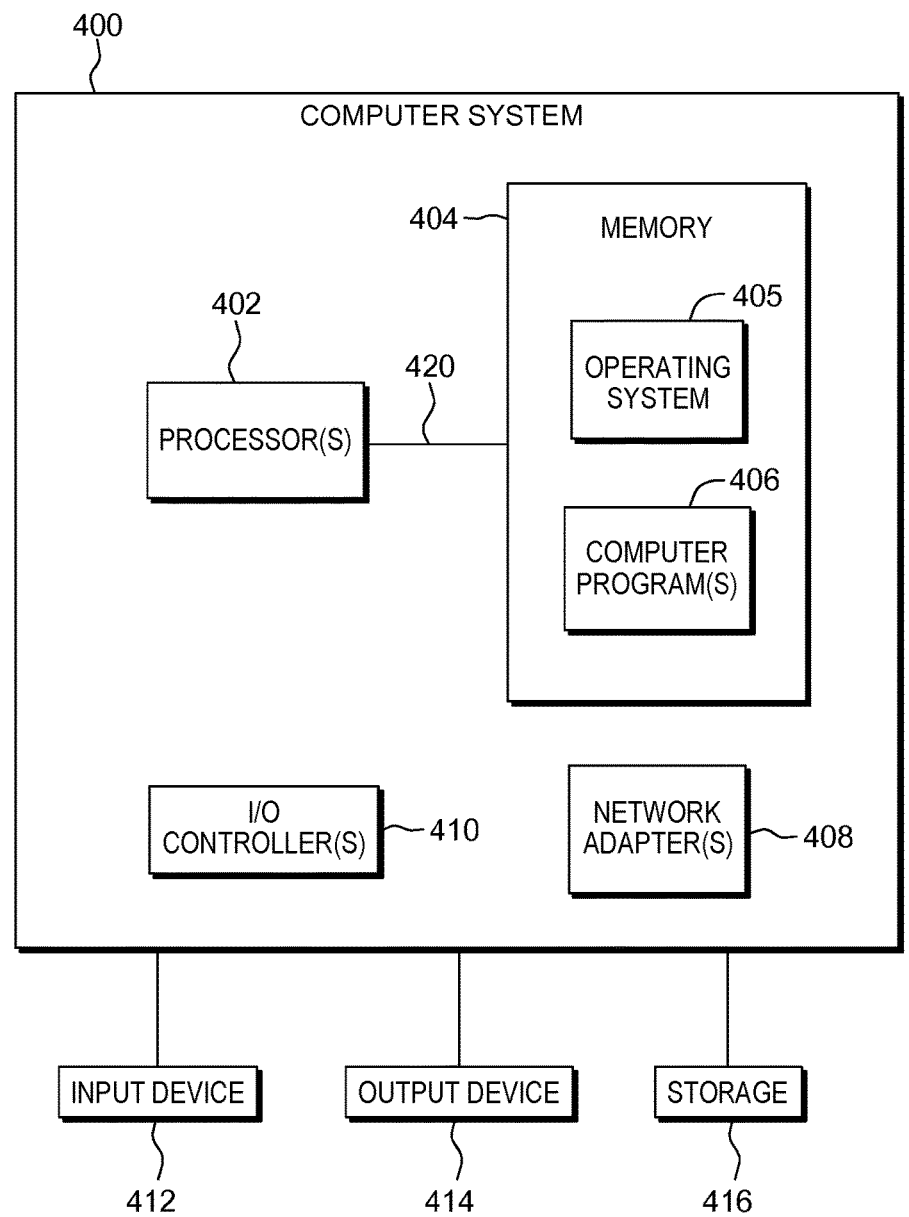
FIG. 4 depicts an example of a computer system to incorporate or use aspects described herein.

FIG. 4 depicts one example of a computer system to incorporate and use aspects described herein. A computer system may also be referred to herein as a processing device/system or computing device/system, or simply a computer. Computer system 400 may be based on one or more of various system architectures such as those offered by International Business Machines Corporation (Armonk, N.Y., USA) or Intel Corporation (Santa Clara, Calif., USA), as examples.

Computer system 400 is suitable for storing and/or executing program code and includes at least one processor 402 coupled directly or indirectly to memory 404 through, e.g., a system bus 420. In operation, processor(s) 402 obtain from memory 404 one or more instructions for execution by the processors. Memory 404 may include local memory employed during actual execution of the program code, bulk storage, and cache memories which provide temporary storage of at least some program code in order to reduce the number of times code must be retrieved from bulk storage during program code execution. A non-limiting list of examples of memory 404 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 404 includes an operating system 405 and one or more computer programs 406, for instance programs to perform aspects described herein.

Input/Output (I/O) devices 412, 414 (including but not limited to displays, microphones, speakers, accelerometers, gyroscopes, magnetometers, light sensors, proximity sensors, GPS devices, cameras, etc.) may be coupled to the system either directly or through I/O controllers 410.

Network adapters 408 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 408 used in computer system.

Computer system 400 may be coupled to storage 416 (e.g., a non-volatile storage area, such as magnetic disk drives, optical disk drives, a tape drive, etc.), having one or more databases. Storage 416 may include an internal storage device or an attached or network accessible storage. Computer programs in storage 416 may be loaded into memory 404 and executed by a processor 402 in a manner known in the art.

The computer system 400 may include fewer components than illustrated, additional components not illustrated herein, or some combination of the components illustrated and additional components. Computer system 400 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 5:
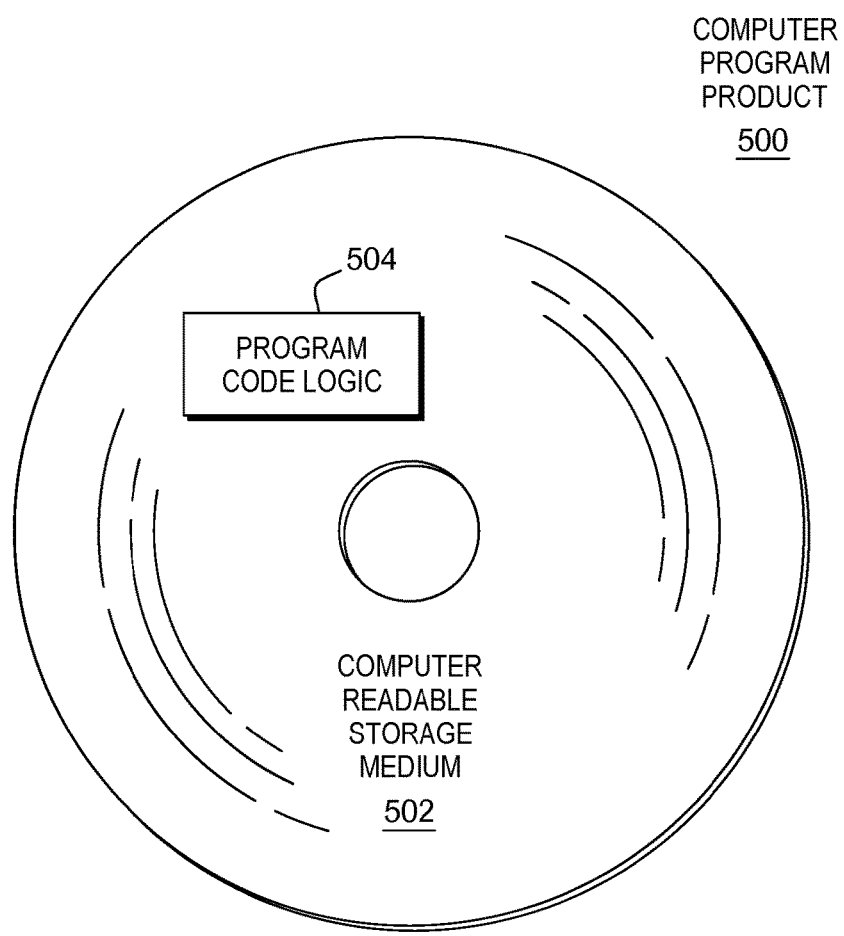
FIG. 5 depicts one embodiment of a computer program product.

Referring to FIG. 5, in one example, a computer program product 500 includes, for instance, one or more computer readable storage media 502 to store computer readable program code means, logic and/or instructions 504 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
predefining a plurality of bandwidth optimization criteria policies, each bandwidth optimization criteria policy of the plurality of bandwidth optimization criteria policies corresponding to a respective type of data transfer event scenario of a plurality of different types of data transfer event scenarios and indicating criteria for establishing a schedule of one or more future times when a data transfer from one site to another site is to occur and when bandwidth allocation is to be dynamically configured corresponding to the schedule, the bandwidth allocation comprising one or more levels of bandwidth to be provisioned to the one site from an elastic network service provider of an elastic cloud computing network;
based on recognizing a data transfer event scenario, selecting a bandwidth optimization criteria policy of the plurality of bandwidth optimization criteria policies based on a type of the data transfer event scenario;
establishing a schedule for transferring data from a source storage location, as the one site, to a target storage location, as the another site, across the elastic network, the schedule being established according to the selected bandwidth optimization criteria policy, wherein the schedule for transferring the data from the source storage location to the target storage location comprises one or more scheduled times to transfer respective portions of the data and indicates one or more levels of bandwidth to be provisioned to the one site at the one or more scheduled times from an elastic network service provider; and using the elastic network in transferring the data to the target storage location, the using comprising dynamically configuring elastic network bandwidth allocation from the elastic network service provider, in which the one or more levels of bandwidth corresponding to the one or more scheduled times to transfer the portions of the data are requested from the elastic network service provider and provisioned therefrom, and initiating transfer of the data to the target storage location according to the schedule.

2. The method of claim 1, wherein one bandwidth optimization criteria policy of the plurality of bandwidth optimization criteria policies corresponds to a predictable type data transfer event scenario in which a data transfer event is planned, the one bandwidth optimization criteria policy specifying an economical bandwidth allocation and transfer of data within a planned time constraint.

3. The method of claim 1, wherein one bandwidth optimization criteria policy of the plurality of bandwidth optimization criteria policies corresponds to an unpredictable type data transfer event scenario in which a data transfer event is unplanned, the one bandwidth optimization criteria policy specifying a priority bandwidth allocation and urgent transfer of data.

4. The method of claim 1, wherein the dynamically configuring comprises dynamically establishing a relationship between the one site and the network service provider to provision bandwidth to the one site in order to effect the transfer of the data.

5. The method of claim 1, wherein establishing the schedule is based on considering cost to transfer the data, taken across a plurality of different bandwidth levels for a plurality of different times of day.

6. The method of claim 1, wherein the transfer of the data occurs across a period of time, and wherein the method further comprises facilitating testing of transferred data at the target storage location during the period of time, the facilitating testing comprising:

dynamically provisioning elastic network bandwidth between the target storage location and at least one additional location from which test connections to the transferred data are made; and initiating the test connections to the transferred data at the target storage location from the at least one additional location.

7. The method of claim 2, wherein the data transfer event scenario comprises a predictable data transfer event scenario and the selected bandwidth optimization criteria policy is the one bandwidth optimization criteria policy, and wherein the schedule is established and the dynamically configuring the elastic network bandwidth allocation is performed to optimize cost of bandwidth provisioned from the elastic network service provider and used in transferring the data within the time constraint.

8. The method of claim 3, wherein the data transfer event scenario comprises an unpredictable data transfer event scenario and the selected bandwidth optimization criteria policy is the one bandwidth optimization criteria policy, and wherein the schedule is established and the dynamically configuring the elastic network bandwidth allocation is performed to optimize cost of bandwidth provisioned from the elastic network service provider and used in allocating a priority level of bandwidth for urgent transfer of data.

9. The method of claim 5, wherein establishing the schedule is based further on a maintenance window.

10. The method of claim 5, wherein establishing the schedule is based further on capabilities of the target storage location to receive and process the data being transferred.

11. The method of claim 6, wherein the initiating the test connections comprises deallocating existing connections to data at the source storage location and allocating those connections to the transferred data at the target storage location using the dynamically provisioned bandwidth.

12. The method of claim 6, further comprising, based on completion of the transfer of the data, deallocating elastic network bandwidth provided to the source storage location from the elastic network service provider.

13. A computer program product comprising:

a computer readable storage medium readable by a processing circuit and storing instructions for execution by the processing circuit for performing a method comprising:

predefining a plurality of bandwidth optimization criteria policies, each bandwidth optimization criteria policy of the plurality of bandwidth optimization criteria policies corresponding to a respective type of data transfer event scenario of a plurality of different types of data transfer event scenarios and indicating criteria for establishing a schedule of one or more future times when a data transfer from one site to another site is to occur and when bandwidth allocation is to be dynamically configured corresponding to the schedule, the bandwidth allocation comprising one or more levels of bandwidth to be provisioned to the one site from an elastic network service provider of an elastic cloud computing network;

based on recognizing a data transfer event scenario, selecting a bandwidth optimization criteria policy of the plurality of bandwidth optimization criteria policies based on a type of the data transfer event scenario;

establishing a schedule for transferring data from a source storage location, as the one site, to a target storage location, as the another site, across the elastic network, the schedule being established according to the selected bandwidth optimization criteria policy, wherein the schedule for transferring the data from the source storage location to the target storage location comprises one or more scheduled times to transfer respective portions of the data and indicates one or more levels of bandwidth to be provisioned to the one site at the one or more scheduled times from an elastic network service provider; and using the elastic network in transferring the data to the target storage location, the using comprising dynamically configuring elastic network bandwidth allocation from the elastic network service provider, in which the one or more levels of bandwidth corresponding to the one or more scheduled times to transfer the portions of the data are requested from the elastic network service provider and provisioned therefrom, and initiating transfer of the data to the target storage location according to the schedule.

14. The computer program product of claim 13, wherein one bandwidth optimization criteria policy of the plurality of bandwidth optimization criteria policies corresponds to a predictable type data transfer event scenario in which a data transfer event is planned, the one bandwidth optimization criteria policy specifying an economical bandwidth allocation and transfer of data within a planned time constraint, wherein the data transfer event scenario comprises a predictable data transfer event scenario and the selected bandwidth optimization criteria policy is the one bandwidth optimization criteria policy, and wherein the schedule is established and the dynamically configuring the elastic network bandwidth allocation is performed to optimize cost of bandwidth provisioned from the elastic network service provider and used in transferring the data within the time constraint.

15. The computer program product of claim 13, wherein one bandwidth optimization criteria policy of the plurality of bandwidth optimization criteria policies corresponds to an unpredictable type data transfer event scenario in which a data transfer event is unplanned, the one bandwidth optimization criteria policy specifying a priority bandwidth allocation and urgent transfer of data, wherein the data transfer event scenario comprises an unpredictable data transfer event scenario and the selected bandwidth optimization criteria policy is the one bandwidth optimization criteria policy, and wherein the schedule is established and the dynamically configuring the elastic network bandwidth allocation is performed to optimize cost of bandwidth provisioned from the elastic network service provider and used in allocating a priority level of bandwidth for urgent transfer of data.

16. The computer program product of claim 13, wherein the transfer of the data occurs across a period of time, and wherein the method further comprises facilitating testing of transferred data at the target storage location during the period of time, the facilitating testing comprising:
  dynamically provisioning elastic network bandwidth between the target storage location and at least one additional location from which test connections to the transferred data are made; and
  initiating the test connections to the transferred data at the target storage location from the at least one additional location.

17. The computer program product of claim 13, wherein the method further comprises, based on completion of the transfer of the data, deallocating elastic network bandwidth provided to the source storage location from the elastic network service provider.

18. A computer system comprising:
  a memory; and
  a processor in communication with the memory, wherein the computer system is configured to perform a method, the method comprising:
    predefining a plurality of bandwidth optimization criteria policies, each bandwidth optimization criteria policy of the plurality of bandwidth optimization criteria policies corresponding to a respective type of data transfer event scenario of a plurality of different types of data transfer event scenarios and indicating criteria for establishing a schedule of one or more future times when a data transfer from one site to another site is to occur and when bandwidth allocation is to be dynamically configured corresponding to the schedule, the bandwidth allocation comprising one or more levels of bandwidth to be provisioned to the one site from an elastic network service provider of an elastic cloud computing network;
    based on recognizing a data transfer event scenario, selecting a bandwidth optimization criteria policy of the plurality of bandwidth optimization criteria policies based on a type of the data transfer event scenario;
    establishing a schedule for transferring data from a source storage location, as the one site, to a target storage location, as the another site, across the elastic network, the schedule being established according to the selected bandwidth optimization criteria policy, wherein the schedule for transferring the data from the source storage location to the target storage location comprises one or more scheduled times to transfer respective portions of the data and indicates one or more levels of bandwidth to be provisioned to the one site at the one or more scheduled times from an elastic network service provider; and
    using the elastic network in transferring the data to the target storage location, the using comprising dynamically configuring elastic network bandwidth allocation from the elastic network service provider, in which the one or more levels of bandwidth corresponding to the one or more scheduled times to transfer the portions of the data are requested from the elastic network service provider and provisioned therefrom, and initiating transfer of the data to the target storage location according to the schedule.

19. The computer system of claim 18, wherein:
  a first bandwidth optimization criteria policy of the plurality of bandwidth optimization criteria policies corresponds to a predictable type data transfer event scenario in which a data transfer event is planned, the first bandwidth optimization criteria policy specifying an economical bandwidth allocation and transfer of data within a planned time constraint, wherein the data transfer event scenario comprises a predictable data transfer event scenario and the selected bandwidth optimization criteria policy is the first bandwidth optimization criteria policy, and wherein the schedule is established and the dynamically configuring the elastic network bandwidth allocation is performed to optimize cost of bandwidth provisioned from the elastic network service provider and used in transferring the data within the time constraint; or
  a second bandwidth optimization criteria policy of the plurality of bandwidth optimization criteria policies corresponds to an unpredictable type data transfer event scenario in which a data transfer event is unplanned, the second bandwidth optimization criteria policy specifying a priority bandwidth allocation and urgent transfer of data, wherein the data transfer event scenario comprises an unpredictable data transfer event scenario and the selected bandwidth optimization criteria policy is the second bandwidth optimization criteria policy, and wherein the schedule is established and the dynamically configuring the elastic network bandwidth allocation is performed to optimize cost of bandwidth provisioned form the elastic network service provider and used in allocating a priority level of bandwidth for urgent transfer of data.

20. The computer system of claim 18, wherein the transfer of the data occurs across a period of time, and wherein the method further comprises facilitating testing of transferred data at the target storage location during the period of time, the facilitating testing comprising:
  dynamically provisioning elastic network bandwidth between the target storage location and at least one additional location from which test connections to the transferred data are made; and initiating the test connections to the transferred data at the target storage location from the at least one additional location.

\* \* \* \* \*